United States Patent [19]

Legrand et al.

[11] Patent Number: 5,057,170
[45] Date of Patent: Oct. 15, 1991

[54] METHOD OF MAKING A SKI BY REVERSIBLE THERMOPLASTIC ASSEMBLY

[75] Inventors: Maurice Legrand; Gilles Recher; Jean-Mary Cazaillon, all of Annecy, France

[73] Assignee: Salomon, S.A., Annecy, France

[21] Appl. No.: 315,576

[22] Filed: Feb. 27, 1989

[30] Foreign Application Priority Data

Feb. 25, 1988 [FR] France ............... 88 02662

[51] Int. Cl.⁵ ............................ B29L 65/06
[52] U.S. Cl. .................. 156/73.5; 264/249; 264/345; 156/629; 156/152; 156/182; 280/610
[58] Field of Search ........... 156/182, 629, 153, 245, 156/79, 73.5, 152; 204/33, 58; 264/46.5, 249, 345; 280/610

[56] References Cited
U.S. PATENT DOCUMENTS

| 4,044,083 | 8/1977 | Howe et al. | 280/610 |
| 4,154,641 | 5/1979 | Hotton | 156/580 |
| 4,222,808 | 9/1980 | Hale et al. | 156/285 |
| 4,233,098 | 11/1980 | Urbain | 156/242 |
| 4,369,970 | 1/1983 | Salminen | 156/152 |
| 4,412,687 | 11/1983 | Andre | 280/610 |
| 4,443,507 | 4/1984 | Yamada et al. | 428/114 |
| 4,487,426 | 12/1984 | Nishizawa | 280/609 |
| 4,525,390 | 6/1985 | Alpaugh | 427/305 |
| 4,556,237 | 12/1985 | Meatto et al. | 280/610 |
| 4,690,736 | 9/1987 | Albericci | 204/58 |
| 4,778,197 | 10/1988 | Floreani | 280/609 |

FOREIGN PATENT DOCUMENTS

| 351416 | 12/1978 | Austria . |  |
| 360885 | 6/1980 | Austria . |  |
| 3003537 | 8/1980 | Fed. Rep. of Germany . |  |
| 2568135 | 1/1986 | France . |  |
| 60-94482 | 5/1985 | Japan | 156/152 |
| 203711 | 6/1939 | Switzerland . |  |

Primary Examiner—Richard V. Fisher
Assistant Examiner—John J. Bruckner
Attorney, Agent, or Firm—Sandler, Greenblum & Bernstein

[57] ABSTRACT

A process of assembling a ski and a ski structure assembled according to the process. The ski includes a plurality of subassemblies which are attached by applying a thermoplastic material to each of the subassemblies; placing the thermoplastic surfaces of adjacent subassemblies together; heating the thermoplastic junction or junctions; and cooling the thermoplastic junction or junctions to thereby effect a weld. The process of assembling the ski permits the shape of the ski to be modified or at least one of the subassemblies to be removed and replaced by subsequent heating of at least the thermoplastic junctions. The use of glue to attach the subassemblies together is avoided to obtain the reversibility of the assembly of the subassemblies.

21 Claims, 2 Drawing Sheets

METHOD OF MAKING A SKI BY REVERSIBLE THERMOPLASTIC ASSEMBLY

BACKGROUND OF THE INVENTION

1. Field of the Invention

The present invention relates to skis utilized in winter sports, and adapted to slide on snow and ice.

2. Description of Background and Relevant Information

Skis known in the art generally include a lower sliding surface connected to two lateral surfaces along two lower edges provided with metallic corners, the lateral surfaces being connected to an upper surface. They generally have a relatively small width with respect to their length, thus defining a longitudinal direction. The front end of the ski is typically curved upwardly to form a spatula.

Known skis generally have a composite structure in which different materials are selected and combined in a manner such that each of them functions in an optimal manner, taking into account the distribution of mechanical stresses. Thus, typical ski structures generally include elements for peripheral protection, forming the upper surface and the lateral surfaces of the ski, and internal resistance elements or resistance blades, made of a material having a high resistance and a high rigidity so as to resist the flexional stresses and the torsional stresses which are generated during skiing. The structure further includes filling elements, and a sliding sole forming the lower surface of the ski and ensuring good sliding on snow.

The composite character of such a ski structure leads to the formation of the ski by assembling a large number of elements which have first been coated or permeated with a glue or resin, generally an epoxy resin, in a mold having the general shape of a ski.

The present invention relates to the process of assembling a ski.

According to techniques now utilized in the manufacture of skis, the elements are assembled by gluing, i.e., by interposing a layer of glue, for example an epoxy resin, for example, between the elements. The glue is selected as a function of the materials to be glued, for its ability to wet the substrata face-to-face and to adhere to the substrata. After hardening, the glue forms a junction layer, uniting the substrata. A glue made of a thermohardening material, or a solvent glue can be utilized.

These known techniques for assembling a ski by gluing lead to substantial difficulties in practice. In particular, during the hardening of the glue, the thermohardening glues or the solvent glues produce dangerous and toxic gases to which the personnel charged with manufacturing the skis are exposed; the hardening of the glue is not instantaneous, and requires waiting a relatively long time, on the order of at least several minutes, which considerably slows down the sequences of manufacture; and the surfaces to be glued have relatively substantial dimensions, which renders the automation of the assembly very delicate and very difficult.

Another disadvantage of the known techniques resides in the fact that the gluing, once achieved, is not reversible. The thermohardening glues or the solvent glues, after gluing, cannot be softened without deterioration. After softening and possible ungluing, the glue loses its ability to adhere, so that the gluing operation, once performed, must be considered final.

Furthermore, taking into account the fact that the surfaces to be glued have relatively large dimensions, it is necessary to utilize considerable quantities of glue, which substantially increases the cost of manufacture.

SUMMARY OF THE INVENTION

The present invention is intended to avoid the disadvantages of prior art skis and prior art ski assembly methods. The process includes assembling a ski from at least a first subassembly and a second subassembly including:

(a) applying a layer of thermoplastic material on the first subassembly, thereby forming an assembly surface for the first subassembly;

(b) applying a layer of thermoplastic material on the second subassembly, thereby forming an assembly surface for the second subassembly;

(c) placing the assembly surface of the first subassembly adjacent the assembly surface of the second assembly;

(d) heating the thermoplastic material of the first subassembly and the second subassembly; and (e) cooling the thermoplastic material of the first subassembly and the second subassembly to thereby weld the first subassembly to the second subassembly.

The process according to the invention further includes gluing the layer of thermoplastic material to the first subassembly.

The process according to the invention further includes providing at least one of the surfaces of the first subassembly with a rough surface and mechanically bonding the thermoplastic layer to the rough surface. The step of mechanically bonding, according to the invention, includes placing the thermoplastic layer adjacent the rough surface and heating the thermoplastic layer b molding.

Still further according to the invention, the assembly surface of at least one of the first subassembly and the second subassembly includes an aluminum alloy surface which is prepared with a sulfochromic treatment, wherein the steps of placing and heating include pressing and heating the aluminum alloy surface and at least one of the first subassembly and the second assembly together.

Still further according to the invention, the assembly surface of at least one the first subassembly and the second subassembly includes an aluminum alloy surface which is prepared with a light non-sealed anodization treatment, wherein the steps of placing and heating include pressing and heating the aluminum alloy surface and at least one of the first assembly and second subassembly together.

Still further according to the invention, at least one of the first subassembly and the second subassembly includes an element of injected polyurethane foam, wherein the step of applying a layer of thermoplastic material on at least one of the first subassembly and the second subassembly includes placing the thermoplastic material adjacent the wall of a mold and injecting the polyurethane foam within the mold to adhere to the thermoplastic material.

Still further according to the invention, the step of placing the thermoplastic layer adjacent the rough surface is performed during the molding of the ski such that the mechanical bonding is achieved at the moment of assembly of the ski.

The step of heating, according to the invention, is preferably performed by the external application of heat energy.

Still further according to the invention, the layers of thermoplastic material are heated before the subassemblies are placed adjacent one another, after which the subassemblies are pressed together.

Still further according to the invention, the thermoplastic material is selected such that its melting point is less than that of other materials in the subassemblies, and the first subassembly and the second subassembly are placed in a heated mold such that the layers of thermoplastic material are pressed together and then heated.

Still further according to the invention, the step of heating can include placing the assembly surfaces adjacent each other and reciprocating the assembly surfaces to produce friction therebetween.

Still further according to the invention, the step of applying a layer of thermoplastic material on the first subassembly and the second subassembly includes applying a layer having a thickness of about between 0.1 and 0.5 millimeters on the subassemblies.

Still further according to the invention, the first assembly is formed to include protection materials, reinforcement materials, and a core, and wherein the second subassembly is formed to include reinforcement materials, the lower edges of the ski, and the sliding surface of the ski.

Still further according to the invention, a third subassembly is formed wherein the first subassembly includes an upper subassembly having protection materials and reinforcement materials, an intermediate second subassembly includes a core and lateral protection materials, and a lower third subassembly includes reinforcement materials, lower ski edges, and a sliding ski surface.

Still further according to the present invention, after the ski has been assembled, the thermoplastic material is heated to soften the thermoplastic material, the shape of the ski is modified, and the ski is cooled to thereby again weld the subassemblies together.

Still further according to the present invention, after the ski has been assembled, the process includes heating the thermoplastic material, separating the subassemblies from one another, replacing at least one of the subassemblies with another subassembly, and cooling the ski to thereby again weld the subassemblies together. This step is facilitated by selecting the thermoplastic material such that its melting point is less than that of other materials of which the ski is made.

The invention can further be characterized as a process of assembling a ski from at least a first subassembly and a second subassembly including:

(a) applying thermoplastic material to the first subassembly;

(b) applying thermoplastic material to the second subassembly;

(c) placing the first subassembly adjacent the second subassembly;

(d) heating the thermoplastic material of the first subassembly and the second subassembly; and (e) cooling the thermoplastic material of the first subassembly and the second subassembly to thereby weld the first subassembly to the second subassembly.

The invention further includes a process of modifying a ski made of at least a first subassembly and a second subassembly between which is a quantity of thermoplastic material, the process including:

(a) heating the ski;
(b) modifying the shape of the ski; and
(c) cooling the ski.

As stated above, this aspect of the invention is facilitated by the thermoplastic material having a melting point lower than that of other materials of which the ski is composed, whereby the step of heating includes heating the ski only to the point at which the thermoplastic material is softened.

The step of modifying the shape of the ski, according to the invention, includes changing the camber of the ski.

Further according to the invention, the step of modifying the shape of the ski includes replacing one or more subassemblies of the ski.

The present invention is also directed to a ski including a first subassembly, a second subassembly, and an intermediate material, the intermediate material having a melting point less than that of either of the first subassembly and the second subassembly, whereby the ski is heated only to the melting point of the intermediate material.

The subassemblies are attached to one another without glue according to the invention. The ski can then be disassembled by heating the ski to the melting point of the intermediate material and removing the first subassembly from the second subassembly.

Also according to the invention, the shape of the ski can be modified by heating the ski to the melting point of the intermediate material, moving the first subassembly relative to the second subassembly to change the camber of the ski, and cooling the ski.

The present invention is further directed to a method of repairing the ski by heating the ski to the melting point of the intermediate material, removing one of the first subassembly and the second subassembly, and replacing the removed subassembly with a third subassembly, heating the intermediate material, and cooling the ski.

BRIEF DESCRIPTION OF THE DRAWINGS

Other objects, characteristics and advantages of the present invention will be further described below with regard to particular embodiments, which are presented as merely exemplary, with reference to the annexed drawings, in which.

DETAILED DESCRIPTION OF PREFERRED EMBODIMENTS

Figure 1:
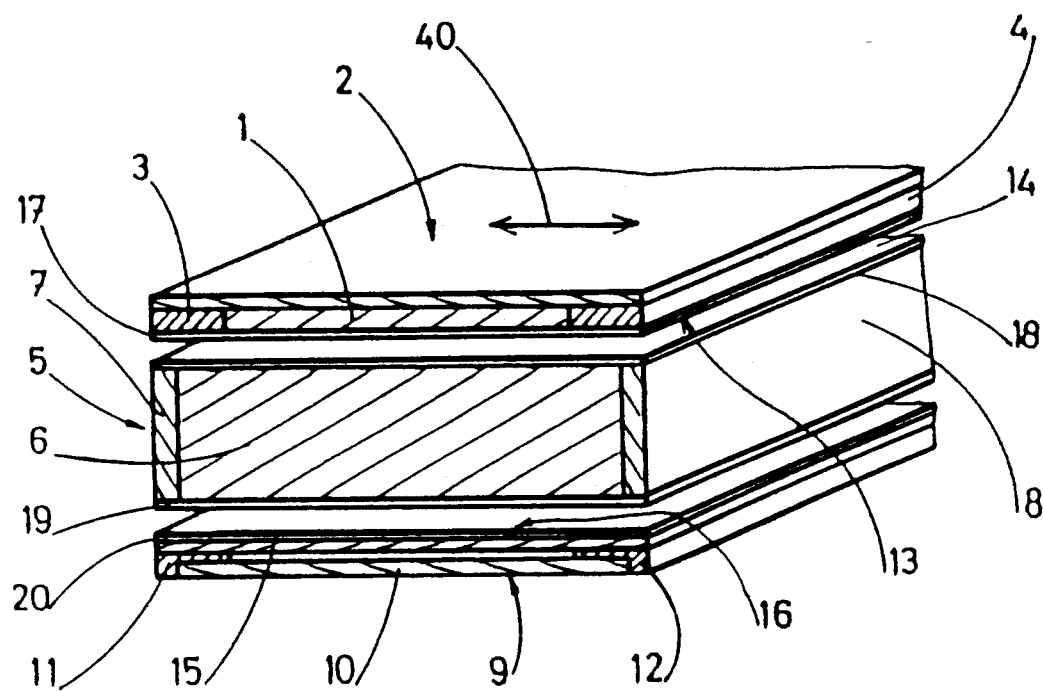
FIG. 1 illustrates in perspective a structure having three subassemblies adapted to form a ski according to the present invention.

The present invention is intended, in particular, to avoid the disadvantages of known assembly processes, by proposing a new assembly process of forming a ski from subassemblies, in which the assembly is ensured by an element which emits no toxic gases. Further, the assembly is easily automated and very rapid, substantially instantaneous; the assembly is ensured by heating of the junction zone of the subassemblies, which avoids in particular the use of solvent.

Further, the assembly thus achieved is reversible, ultimately permitting the softening or the selective fusion of the assembly layer of any two subassemblies of the ski. The fusion of the assembly layer permits the total separation of the two subassemblies with respect to one another. The softening of the assembly layer permits the ultimate modification of the shape of the ski.

One can attempt to obtain the reversible character of such an assembly of two subassemblies of a ski by utilizing a thermofusible glue, inserted between the two surfaces of the substrata to be assembled. After hardening, the thermofusible glue can again be softened or melted by raising its temperature. However such a technique has two major disadvantages. First, the thermofusible glues are very costly, such that their use substantially increases the cost of manufacture of the ski. Second, and, in particular, thermofusible glues are not presently available which have an adherent ability which is sufficient for all of the materials constituting the surfaces to be assembled. In the composite structure of the ski, very diverse materials such as polyurethane foam surfaces, metallic surfaces and other synthetic materials are used.

The process of the present invention makes possible the assembly of ski subassemblies whose surfaces are constituted of the most diverse materials, the assembly being achieved by heating without the necessity of glue, such that the cost of manufacture is substantially reduced.

To achieve these objects as well as others, the process according to the invention includes providing, on the first and second assembly surface, respectively, of a first and second subassembly of a ski, a first thin layer and a second thin layer of thermoplastic material, each thin layer of thermoplastic material being affixed to the corresponding subassembly; the respective surfaces of the assembly are pressed against one another, while heating the thermoplastic material forming the thin layers to cause its fusion; after cooling, the thin layers of thermoplastic material are welded to one another, ensuring the affixation of the subassemblies.

According to one embodiment, the thin layer forming the assembly surface of a subassembly can be achieved by first gluing a film of thermoplastic material on the subassembly by means of a glue which adheres to the thermoplastic material.

According to another embodiment, the assembly surface of a subassembly is achieved by the preliminary mechanical bonding of a film of thermoplastic material on a rough surface of the subassembly.

For example, the mechanical bond can be achieved during the molding of the subassembly, by heating of the thermoplastic material. What is meant by a mechanical bond, in this instance, is the thermoplastic material forming the thin assembly layer during fusion or preliminary softening in the course of manufacture of the subassembly, in which it deforms and infiltrates all of the interstices present on a rough surface of the material which forms the subassembly. After cooling of the thermoplastic material, the latter remains affixed to the rough surface of the subassembly. Such a mechanical bond is well adapted, for example, for the formation of the assembly surface of a core made out of polyurethane foam, or out of wood or other cellular material currently utilized in the manufacture of skis.

A substantial advantage inheres from the present invention by the fact that one avoids the preliminary phases of preparing the surface which are generally necessary before gluing a surface of cellular material with the traditional gluing techniques. The gluing necessitates providing correctly prepared surfaces by rubbing down, sanding, or by the application of a bonding primer. In a process according to the present invention, by mechanical bonding of the thermoplastic material, the preliminary steps of preparing the state of the surface of cellular materials are avoided.

The subassembly thus prepared, with an assembly surface constituted by a thin layer of thermoplastic material, can be easily stored, manipulated and transported by automatic means. The ultimate assembly of the two subassemblies does not require the addition of any other element, a simple application of heat making it possible to form the assembly.

According to one embodiment, the heating can be ensured by the exterior application of heat energy, whereas the subassemblies are arranged in a mold giving the desired shape to the ski.

Alternatively, one can ensure the preliminary heating of the two assembly surfaces, then ensure their affixation before cooling.

According to another embodiment, the heating of the assembly surfaces is obtained by mechanical friction of the two surfaces between one another by means of transverse mechanical reciprocation with respect to the longitudinal axis of the ski. One thus achieves a very rapid local heating, limited to the surfaces to be welded themselves, such that the other elements of the subassemblies of the ski are not affected by the rise in temperature.

The invention takes advantage of the reversible character of the fusion and solidification of a thermoplastic material by providing, after forming the ski and solidification of the layer of thermoplastic material, an ultimate heating of the ski producing the softening of the binding layer made out of thermoplastic material. During softening, it is possible to deform the ski to give it the desired shape, and the ski retains the new shape after cooling and solidification of the thermoplastic material layer.

The total fusion of the layer of the thermoplastic material furthermore makes possible the separation of the subassemblies with respect to one another, for example, for the repair of an outer layer of the ski.

FIG. 1 illustrates an example of the composite structure of a ski having three subassemblies. For example, the upper subassembly 1 includes external protection materials, forming the upper surface 2 of the ski and the upper edges 3 and 4. The upper subassembly can include reinforcement materials such as laminated glass resin, fiberglass, aluminum alloys or other mechanically resistant elements.

The intermediate subassembly 5 includes the core 6 of the ski, and lateral protection surfaces 7 and 8.

The lower subassembly 9 includes the sliding sole 10 forming the lower surface of the ski, the lower edges 11 and 12, such as metallic edges, and reinforcement materials.

Each subassembly 1, 5 and 9 is formed separately, and includes at least one assembly surface allowing for its affixation to another subassembly. Thus, the upper subassembly 1 has a lower assembly surface 13; the intermediate subassembly 5 has an upper assembly surface 14 and a lower assembly surface 15. The lower subassembly 9 has an upper assembly surface 16. According to the invention, each of the assembly surfaces 13, 14, 15 and 16 is constituted by a thin layer of thermoplastic material; the assembly surface 13 is constituted by the thin layer 17; the assembly layer 14 is constituted by the thin layer 18; the assembly surface 15 is constituted by the thin layer 19; and the assembly surface 16 is constituted by the thin layer 20.

Thus, each of the subassemblies includes on its surface which ultimately comes into contact with another subassembly, a thin film of thermoplastic material. The thickness of the thin film of thermoplastic material is preferably on the order of 0.1–0.5 mm.

The thermoplastic materials constituting two assembly surfaces adapted to come into contact with one another are preferably the same. One can, however, conceive of utilizing two different thermoplastic materials. It suffices that they be compatible with one another during the welding operation, i.e., that they can be welded to one another by heating.

The thin layers of thermoplastic material must be affixed to the corresponding subassemblies by means which are adapted to withstand, without breaking down, a sufficiently high temperature to melt the thermoplastic material to form the thin layer and to allow for the welding of the two thermoplastic layers during the assembly of the ski. Depending upon the nature of the materials forming the particular subassembly, the affixation of the thin layer of thermoplastic material with the rest of the subassembly can be ensured in various manners.

Figure 5:
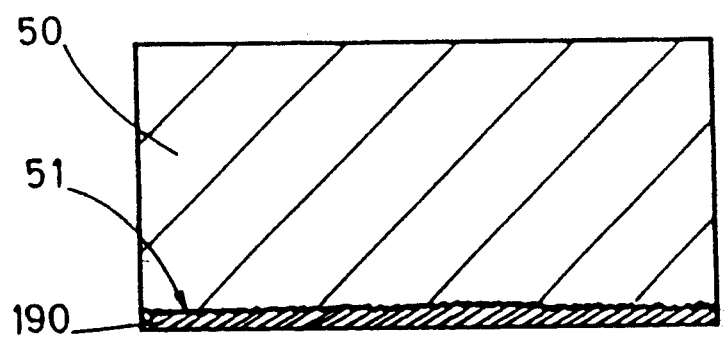
FIG. 5 schematically illustrates in cross-section a subassembly provided with a thin layer of thermoplastic material affixed to the subassembly by mechanical bond.

By way of example, a subassembly 50 made out of cellular material is shown in FIG. 5, having on its lower surface 51 a roughness or unevenness resulting either from the natural state of the surface of the material, or by treatment of the surface. In such a case, the layer 190 of thermoplastic material can be affixed to the lower surface 51 of the subassembly 50 by mechanical bonding. During the formation of the subassembly 50, a film of thermoplastic material is applied against the lower surface 51 which, by heating, softens and adheres to the surface 51. This embodiment is possible, for example, with subassemblies 50 having a machined core. One can thus give to the surface 51 a roughness or a surface state which facilitates the mechanical bonding of the thermoplastic material. This embodiment is equally particularly well adapted for subassemblies 50 having a machined core of polyurethane foam which is impregnated with fibers, for example of the "ISOCORE" type. In this case, the core does not require preparation of a particular surface, perforations can be simply obtained by the use of points. The necessity of surface treatments, which are necessary when a polyurethane core is assembled by gluing, are thus avoided. It is to be noted that the presence of fibers substantially improves the quality of mechanical bonding of layer 190 of thermoplastic material on subassembly 50.

Figure 6:
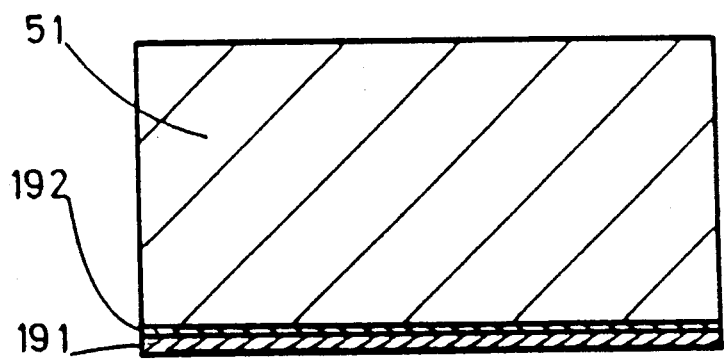
FIG. 6 schematically illustrates in cross-section a subassembly according to the present invention in which the thin layer of thermoplastic material is affixed by gluing.

FIG. 6 shows a second embodiment of a layer 191 of thermoplastic material on a subassembly 51. In this embodiment, the affixation is ensured by gluing, and the figure shows a layer 192 of glue connecting the thermoplastic material 191 and the rest of the subassembly 51. In this embodiment, one preferably selects a layer 191 made out of a thermoplastic material compatible with the glues 192 which are generally utilized for the manufacture of skis, and in particular with the epoxy glues.

In the embodiment of FIG. 5, for cores made out of injected polyurethane foam, it suffices to place a film of thermoplastic material 190 against the walls of the mold in which the foam is injected. The foam adheres to the film made of thermoplastic material during injection. As a result, such a process makes it possible to eliminate the steps of preparing the surface of the cores.

In the case of a machined core 50, adapted to have a mechanical bond with the thermoplastic material, a film of thermoplastic material 190 can be placed in between during the assembly of the ski.

According to another embodiment, adapted in particular for the formation of the lower subassembly 9 and the upper subassembly 1 of the ski, the creation of the subassemblies can be achieved flat, and a film of thermoplastic material is affixed to the rest of the subassembly by the resin of the reinforcement element forming the principal structure of the subassembly.

In the case of a metallic alloy, it suffices generally to add a suitable glue.

For aluminum alloys, the treatment of the surface is necessary before any type of gluing can be sufficient to ensure a good direct adherence of the thermoplastic layer, particularly in the case of a sulfochromic treatment or a light non-sealed anodization. It suffices to select a fusion temperature of the film and an appropriate pressure. It is necessary that the thermoplastic material be sufficiently liquefied to penetrate into the micropores of the metallic surface.

The thermoplastic materials of the IONOMER types (modified copolymer of ethylene and methacrylic acid) or of the EAA type (copolymer of ethylene and acrylic acid) adhere directly to the aluminum alloys thus treated.

Figure 2:
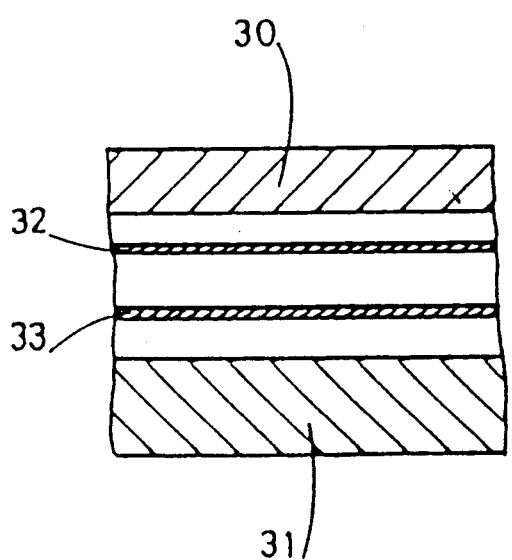
FIGS. 2-4 illustrate the steps of assembly of two subassemblies according to the present invention.
Figure 3:
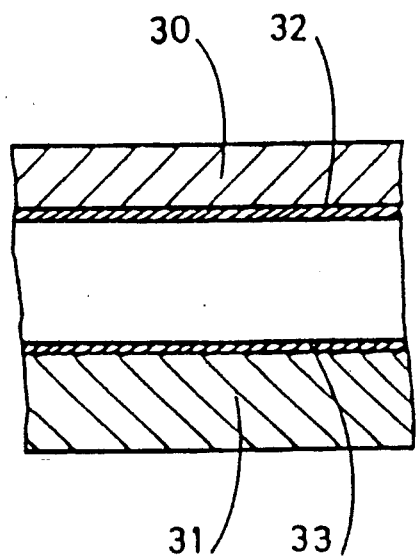
Figure 4:
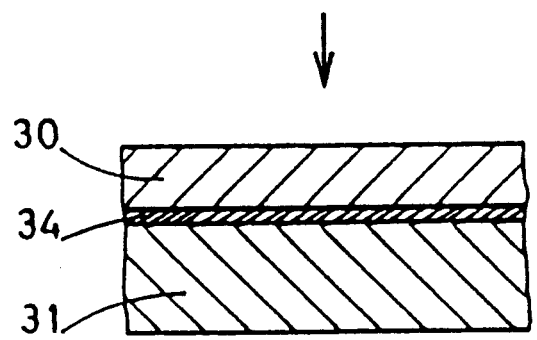

FIGS. 2–4 schematically represent the three principal steps of an assembly process according to the present invention, in an embodiment in which the ski includes two subassemblies 30 and 31. For example, the upper subassembly 30 includes the materials for protection, the reinforcement materials, the core and the lateral protections for the ski. The lower subassembly 31 includes reinforcement materials, the edges and the sliding sole. The constituent elements of each of the subassemblies are not detailed in the figures.

The upper subassembly 30 is adapted to be associated with a film 32 of thermoplastic material, while the lower subassembly 31 is adapted to be associated with the film 33 made of thermoplastic material. Initially, the four elements are separate, as seen in FIG. 2.

In a preliminary phase, the two subassemblies are separately formed, on the one hand by assembly of the upper subassembly 30 with the thermoplastic film 32 and, on the other hand, by assembly of the subassembly 31 with the thermoplastic film 33, as shown in FIG. 3. The two subassemblies thus obtained can be usefully manipulated, the surfaces of thermoplastic material 32 and 33 being clean and in solid form. This constitutes a particularly important advantage of the present invention.

In the course of the assembly phase, schematically shown in FIG. 4, the two layers of thermoplastic material 32 and 33 are positioned against one another, and, by heating of the two layers, they are fused by heat welding to form only a single junction layer 34. After cooling, the junction layer 34 solidifies and ensures the affixation of the subassemblies 30 and 31.

In a first embodiment, the assembly step can be achieved by means of a mold, into which the two subassemblies 30 and 31, provided with their layers of thermoplastic material 32 and 33, are inserted. By elevation of the temperature of the assembly of the ski, the layers of thermoplastic material are fused and heat welded. After cooling, the ski maintains the shape which has been given to it by the mold.

According to a second embodiment, the heating of the layers of thermoplastic material is ensured by a reciprocal mechanical movement of the two subassemblies with respect to one another, along a direction substantially parallel to the assembly surfaces and substantially transverse with respect to the ski, as shown by the double arrow 40 of FIG. 1. The reciprocal mechanical movement causes a friction of the two surfaces against one another, and localized heating between the two surfaces. This embodiment makes it possible to utilize thermoplastic materials whose melting point is equal to or greater than the melting point of certain of the other elements of the ski.

On the other hand, in the embodiment in which the heating is effected by the application of exterior heat energy, for example in a mold, a thermoplastic material must be selected whose melting point is less than the melting point of the other elements of the ski.

According to another embodiment, the assembly surfaces of the subassemblies can be preheated, for example by rows of infrared lamps, and then the two surfaces are pressed against one another to obtain their welding.

A ski assembled according to the present invention allows for later interventions resulting in voluntary and controlled modification of its shape, particularly with regard to its camber and for repair.

To modify the shape, the ski is heated to obtain the softening of the junction layers made of thermoplastic material, and then the desired shape, or desired camber of the ski is effected, for example. Thereafter, the ski is then cooled to again weld the subassemblies and to obtain the desired shape of the ski.

To repair the ski by replacing a subassembly, the ski is heated to obtain the melting of the junction layers made of thermoplastic material, the defective subassemblies are separated, a replacement subassembly is assembled with the one or more remaining initial subassemblies. After ensuring that the layers of thermoplastic material of the subassemblies, including that of the new subassembly, are heated to effect their proper attachment, the ski is cooled to ensure the welding.

Although the invention has been described with respect to particular means, materials and embodiments, it is to be understood that the invention is not limited to the particulars disclosed and extends to all equivalents within the scope of the claims.

What is claimed is:

1. A process of assembling a ski from at least a first subassembly and a second subassembly comprising:
   (a) applying a first solid layer of thermoplastic material on said first subassembly, thereby forming an assembly surface for said first subassembly;
   (b) applying a second solid layer of thermoplastic material on said second subassembly, thereby forming an assembly surface for said second subassembly;
   (c) placing said assembly surface of said first subassembly adjacent said assembly surface of said second subassembly;
   (d) heating said thermoplastic material, of said first subassembly and said thermoplastic material of said second subassembly; and
   (e) cooling said thermoplastic material of said first subassembly and said second subassembly to thereby weld said fist subassembly to said second subassembly.

2. The process of claim 1 wherein said step of applying a thermoplastic layer to at least said first subassembly comprises gluing said layer of thermoplastic material to said first subassembly.

3. The process of claim 1 wherein at least said step of applying a thermoplastic layer to said first subassembly comprises providing at least one of the surfaces of said first subassembly with a rough surface and mechanically bonding said thermoplastic layer to said rough surface.

4. The process of claim 3 wherein said step of mechanically bonding comprises placing at least said first subassembly in a mold, wherein said thermoplastic layer is positioned adjacent said rough surface and heating said thermoplastic layer while in said mold.

5. The process of claim 4 wherein at least one of said first subassembly and said second subassembly comprises an element of injected polyurethane foam, wherein said step of applying a layer of thermoplastic material on at least one of said first subassembly and said second subassembly comprises placing said thermoplastic material adjacent the wall of a mold and injecting said polyurethane foam within said mold to adhere to said thermoplastic material.

6. The process of claim 3 further comprising the step of placing at least said first subassembly and said second subassembly in a mold for forming said ski, wherein said thermoplastic layer is placed adjacent said rough surface during the molding of said ski such that said mechanical bonding is achieved during said forming said ski.

7. The process of claim 1 wherein said step of heating is performed by the external application of heat energy.

8. The process of claim 7 wherein said layers of thermoplastic material are heated before said subassemblies are placed adjacent one another, after which said subassemblies are pressed together., 9. The process of claim 7 further comprising selecting the thermoplastic material such that its melting point is less than that of other materials in said subassemblies, and wherein said first subassembly and said second subassembly are placed in a heated mold, such that said layers of thermoplastic material are pressed together and then heated.

10. The process of claim 1 wherein said step of heating comprises placing said assembly surfaces adjacent each other and reciprocating said assembly surfaces to produce friction therebetween.

11. The process of claim wherein said step of applying a layer of thermoplastic material on said first subassembly and said second subassembly comprises applying a layer having a thickness of about between 0.1 and 0.5 millimeters on said subassemblies.

12. The process of claim 1 wherein said first subassembly includes protection materials, reinforcement materials, and a core, and wherein said second subassembly is formed to include reinforcement materials, the lower edges of the ski, and the sliding surface of the ski.

13. The process of claim 1 further comprising a third subassembly wherein said first subassembly comprises an upper subassembly having protection materials and reinforcement materials, said third subassembly comprising an intermediate subassembly having a core and lateral protection materials, said second subassembly comprising a lower subassembly having reinforcement materials, lower ski edges, and a sliding ski surface.

14. The process of claim 1 wherein after said ski has been assembled, reheating said thermoplastic material to soften said thermoplastic material, modifying the shape of said ski, and cooling said ski to thereby again weld said subassemblies together.

15. The process of claim 1 wherein after said ski has been assembled, reheating said thermoplastic material, separating said subassemblies from one another, replacing at least one of said subassemblies with another subassembly, and cooling said ski to thereby again weld said subassemblies together.

16. The process of claim 1 further comprising selecting the thermoplastic material such that its melting point is less than that of other materials of which said ski is made.

17. The process of modifying a ski having a shape and made of at lest a first subassembly and a second subassembly between which is a quantity of thermoplastic material having a softening point, said process comprising:
    (a) heating said ski to a temperature at least to said softening point of said thermoplastic material;
    (b) modifying the shape of said ski; and
    (c) cooling said ski, wherein said step of modifying the shape of said ski comprises replacing one or more subassemblies of said ski.

18. The process of claim 17 wherein said thermoplastic material has a melting point lower than that of other materials of which said ski is composed, and wherein said step of heating comprises heating said ski only to the point at which said thermoplastic material is softened.

19. The process of claim 17 wherein said step of modifying the shape of said ski also comprises changing the camber of the ski.

20. A process of assembling a ski from at least a first subassembly and a second subassembly comprising:
    (a) applying a first layer of thermoplastic material on said first subassembly, thereby forming an assembly surface for said first subassembly;
    (b) applying a second layer of thermoplastic material on said second subassembly, thereby forming an assembly surface for said second subassembly;
    (c) placing said assembly surface of said first subassembly adjacent said assembly surface of said second subassembly;
    (d) heating said thermoplastic material of said first subassembly and said thermoplastic material of said second subassembly; and
    (e) cooling said thermoplastic material of said first subassembly and said second subassembly to thereby weld said first subassembly to said second subassembly,
    wherein said assembly surface of at least one of said first subassembly and said second subassembly comprises a sulfochromically treated aluminum alloy surface, wherein said steps of placing and heating comprise pressing and heating said aluminum alloy surface and at least one of said first subassembly and said second subassembly together.

21. A process of assembling a ski from at least a first subassembly and a second subassembly comprising:
    (a) applying a first layer of thermoplastic material on said first subassembly, thereby forming an assembly surface for said first subassembly;
    (b) applying a second layer of thermoplastic material on said second subassembly, thereby forming an assembly surface for said second subassembly;
    (c) placing said assembly surface of said first subassembly adjacent said assembly surface of said second subassembly;
    (d) heating said thermoplastic material of said first subassembly and said thermoplastic material of said second subassembly; and
    (e) cooling said thermoplastic material of said first subassembly and said second subassembly to thereby weld said first subassembly to said second subassembly,
    wherein said assembly surface of at least one of said first subassembly and said second subassembly comprises an anodization treated aluminum alloy surface, wherein said steps of placing and heating comprise pressing and heating said aluminum alloy surface and at least one of said first subassembly and said second subassembly together.

* * * * *